US 9,035,832 B2

(12) United States Patent
Tikka et al.

(10) Patent No.: US 9,035,832 B2
(45) Date of Patent: May 19, 2015

(54) MOBILE COMMUNICATION DEVICE WITH IMPROVED ANTENNA PERFORMANCE

(75) Inventors: Pasi Tikka, Munich (DE); Pasi Lehtonen, Rusko (FI); Juha Ella, Halikko (FI)

(73) Assignee: EPCOS AG, Munich (DE)

( * ) Notice: Subject to any disclaimer, the term of this patent is extended or adjusted under 35 U.S.C. 154(b) by 329 days.

(21) Appl. No.: 13/643,915

(22) PCT Filed: Apr. 26, 2010

(86) PCT No.: PCT/EP2010/055549
§ 371 (c)(1),
(2), (4) Date: Dec. 28, 2012

(87) PCT Pub. No.: WO2011/134492
PCT Pub. Date: Nov. 3, 2011

(65) Prior Publication Data
US 2013/0120219 A1     May 16, 2013

(51) Int. Cl.
| H01Q 1/24 | (2006.01) |
| H01Q 21/00 | (2006.01) |
| H01Q 21/28 | (2006.01) |
| H04B 7/06 | (2006.01) |
| H04B 7/08 | (2006.01) |

(52) U.S. Cl.
CPC ............. *H01Q 21/00* (2013.01); *H01Q 1/243* (2013.01); *H01Q 21/28* (2013.01); *H04B 7/0613* (2013.01); *H04B 7/0825* (2013.01)

(58) Field of Classification Search
CPC ........ H01Q 1/243; H01Q 21/00; H01Q 21/28
USPC ................................................... 343/702, 848
See application file for complete search history.

(56) References Cited

U.S. PATENT DOCUMENTS

| 7,411,557 | B2 | 8/2008 | Shimizu et al. | |
| 7,505,006 | B2 | 3/2009 | Ollikainen et al. | |
| 7,782,261 | B2 * | 8/2010 | An et al. | 343/702 |
| 7,940,223 | B2 * | 5/2011 | Dou et al. | 343/702 |
| 2010/0081407 | A1 | 4/2010 | Adler et al. | |

FOREIGN PATENT DOCUMENTS

| EP | 1 763 152 A1 | 3/2007 |
| EP | 2 109 230 A1 | 10/2009 |
| JP | 2004-072605 A | 3/2004 |

(Continued)

OTHER PUBLICATIONS

Ollikainen, J., "Design and Implementation Techniques of Wideband Mobile Communications Antennas," Dissertation, Helsinki University of Technology Radio Laboratory Publications, Report S 266, Nov. 2004, 70 pages.

*Primary Examiner* — Hoang V Nguyen
(74) *Attorney, Agent, or Firm* — Slater & Matsil, L.L.P.

(57) ABSTRACT

Mobile communication devices with improved antenna performance are provided. A mobile communication device includes a first antenna, a ground plane, and a diversity antenna. In a mode of operation which is not a multi-antenna transmission mode, the diversity antenna is electrically coupled to the ground plane. The diversity antenna increases the electrical length of the ground plane and enhances the antenna performance of the radiating assembly of the first antenna in combination with the ground antenna and the diversity antenna.

11 Claims, 4 Drawing Sheets

(56) References Cited

FOREIGN PATENT DOCUMENTS

| JP | 2007-096976 A | 4/2007 |
| JP | 2007-104637 A | 4/2007 |
| WO | WO 03/049321 A1 | 6/2003 |
| WO | WO 2010/052150 A1 | 5/2010 |

* cited by examiner

MOBILE COMMUNICATION DEVICE WITH IMPROVED ANTENNA PERFORMANCE

This patent application is a national phase filing under section 371 of PCT/EP2010/055549, filed Apr. 26, 2010, which is incorporated herein by reference in its entirety.

TECHNICAL FIELD

The present invention relates to mobile communication devices offering improved antenna performance.

BACKGROUND

Modern mobile communication devices need to be small and lightweight but have to support multiple frequency bands or multiple communication standards, such as GSM (Global System for Mobile Communications), (W)CDMA ((Wideband) Code Division Multiple Access), or LTE (Long-Term Evolution). LTE, a communication standard of the fourth generation, 4G, enables operating two antennas simultaneously. Multi-antenna transmission modes in LTE systems can improve the service capabilities of a communication device. Therefore, a mobile communication device can comprise a main antenna and a diversity antenna.

From U.S. Pat. No. 7,505,006 B2, an antenna arrangement comprising a coupling antenna element and an extension element is known. An antenna element has a first resonant frequency and a first bandwidth and the extended conductive element has a second resonant frequency and a second bandwidth. Thus, an antenna arrangement is provided that can cover a broad range of frequencies.

From U.S. Patent Publication No. 2010/0081407 A1 filter stages for high data rates are known. In one embodiment of a "diversity receiver" a switch has a switching state in which an antenna is electrically connected to an impedance which is chosen so that a phase angle caused by the reflection allows for optimizing mutual coupling between the antenna and a further antenna.

However, current demands towards smaller communication devices inhibit designers of modern communication devices to include additional antenna components within modern communication devices although communication devices with improved antenna performance are needed. An improved antenna performance e.g., helps saving energy.

SUMMARY OF THE INVENTION

One aspect of the invention to provides a mobile communication device that supports multiple frequency bands and multiple communication standards, that allows to be integrated into a smaller housing, and that has a better antenna performance.

The present invention provides a mobile communication device comprising a ground plane, a first antenna and a diversity antenna. The first antenna can couple electromagnetically to the ground plane during operation. A diversity antenna can couple electromagnetically to the ground plane during operation, as well. During operation of the first antenna, the coupling of the diversity antenna to the ground plane enhances the performance of the first antenna, especially when said diversity antenna coupling is optimized by using suitable load between diversity antenna and the ground plane.

The coupling of the diversity antenna to ground plane may be different when it is used for diversity reception and when used to enhance the performance of the first antenna. Therefore, different coupling circuits having different impedances or the same coupling circuit having an adjustable impedance can be utilized.

Such a mobile communication device has an antenna with improved antenna performance. As the mobile communication device comprises a first antenna, which may be a main antenna, and a diversity antenna, it is well suited for multi-antenna transmission modes of, for example, LTE systems.

Usually, a main antenna and its ground plane couple electromagnetically and work as a radiating element. The inventors found that increasing the electrical length of a ground plane of a mobile communication yields an increased frequency bandwidth of this radiating element. Thus, a longer ground plane yields a broader bandwidth. An enhanced bandwidth yields better matching and better radiating efficiency at the edges of the frequency bands. However, the trend towards smaller communication devices forbids increasing the lateral dimensions of the ground plane.

Further, the inventors found that the electrical length of a ground plane can be increased by electromagnetically coupling the ground plane to an additional radiating element. However, adding additional radiating elements to a mobile communication device is—again—detrimental in view of the trend towards smaller devices.

Electromagnetically coupling the ground plane to a diversity antenna that is needed by a communication device for multi-antenna transmission modes anyway and is, hence, already present in the device, however, yields a better antenna performance of the main antenna without the need to add further radiating elements to the communication device.

Thus, the first antenna of the present invention may be a main antenna of a mobile communication device.

Further, to get maximum benefit from the diversity antenna, the diversity antenna should be located as far as possible from the main antenna. It is, therefore, possible to locate the diversity antenna and the first antenna at opposite ends or sides of an according mobile communication device to get an optimal performance.

In an according mobile communication device, the first antenna, the ground plane and the diversity antenna work together and act as a radiating element that has a better performance compared to an antenna assembly comprising only the first antenna and the ground plane.

In practice, the diversity antenna becomes a radiating part of the ground plane increasing the electrical length of the ground plane.

Coupling a diversity antenna electromagnetically to a ground plane, e.g., during a communication standard that does not need multi-antenna transmission modes, is not a triviality: one aspect in gaining a lightweight mobile communication device is reducing the weight of the device's battery. Then, however, the power consumption of the mobile communication device has to be reduced to allow sufficient time of operation. The most important step in reducing the power consumption of the mobile communication device is to deactivate every component that is not needed during a current operation mode. In multi-antenna transmission modes, the diversity antenna cannot be deactivated. For example, in GSM communication mode the diversity antenna is not used for communication and is usually switched off together with all diversity reception related electronics. In WCDMA, the usage of diversity antenna is optional, here also it could be switched off or used for other purposes. It is clear that the diversity antenna and its related electronics would be deactivated in WCDMA mode when saving energy is important.

However, the inventors found that energy can also be saved if the antenna performance is enhanced. This is because less power has to be transmitted via an antenna with a reduced insertion loss.

Thus, it is possible to reduce the power consumption of a mobile communication device by keeping a diversity antenna active although it is not used for multi-antenna transmission modes.

As the first antenna, the ground plane and the diversity antenna act as a radiating element, it is clear that the ground plane cannot be regarded as being on a strict ground potential. The ground plane may be electrically connected to a ground connection but the electromagnetic potential of the ground plane may not be the electromagnetic potential of a conventional ground.

In one embodiment, coupling the diversity antenna to the ground plane enhances the bandwidth of the first antenna by a factor of at least 1.1 or 1.3 or more. Therefore, a predefined load impedance of a coupling circuit can be utilized.

Enhanced bandwidth causes a better efficiency, e.g., reduced insertion loss, at the edges of a frequency band.

In one embodiment of the present invention, coupling the diversity antenna to the ground plane enhances the transmission coefficient of the first antenna by at least 3 dB.

A reduction by 3 dB correlates to a Tx power consumption that is reduced by 50%. Thus, although energy has to be spent to keep the diversity antenna active, energy can be saved in total.

In one embodiment, the first antenna and the diversity antenna are specified for an LTE communication device.

In one embodiment, the first antenna and the diversity antenna are arranged on opposite ends of the ground plane. Then, the benefit from the diversity antenna is enhanced as the electrical length of the ground plane is maximized.

In one embodiment, the device further comprises a PWB (PWB=Printed Wiring Board) where the ground plane is arranged on the PWB. The PWB comprises an electrically insulating material having a dielectric constant κ. The dielectric constant κ determines the capacity and the inductance of the ground plane. The dielectric constant κ is chosen to enhance the antenna's performance. However, the geometrical dimensions of the ground plane are important to obtain a good antenna characteristic, too.

In one embodiment, the ground plane has a first electrical length and the diversity antenna has a second electrical length and the combination of the first antenna and the ground plane has an electrical length. The electrical length of this combination is longer than each of the lengths of the antenna or the ground plane alone.

In one embodiment, coupling the diversity antenna to the ground plane enhances the performance of the first antenna in a GSM operation mode, in a WCDMA operation mode, or in a LTE TDD (TDD=time division Duplexing) operation mode.

A LTE TDD operation mode can also benefit from a diversity antenna coupled to the ground plane. The diversity antenna—which may be a MIMO antenna (MIMO=multiple-input and multiple-output)—could be used to improve the main antenna performance during the Tx slot and used as MIMO or diversity antenna during the Rx slot. LTE TDD is similar to GSM in that aspect that is has time divided Tx and Rx slots.

In principle, it is possible to enhance the performance of the first antenna in any operation mode that does not necessarily need the diversity antenna active.

In one embodiment, the diversity antenna is terminated with a bandpass filter or with a predefined load. The bandpass filter or the predefined load establish the coupling circuit.

Again, the phrase "termination" does not mean applying the electromagnetic potential of the ground plane to a ground potential, but changing the coupling by this load. In this context, terminating the diversity antenna with a bandpass filter or with a predefined load means that a bandpass filter or a predefined load is electrically connected between the diversity antenna and the ground plane. With such a termination, the electromagnetical coupling between the ground plane and the diversity antenna is established without the need for further impedance elements.

In one embodiment, the mobile communication device further comprises a switch that provides an electrical connection between the diversity antenna on one side and a bandpass filter or a predefined load impedance on the other side. With such a switch, the termination of the antenna can be matched individually in response to changes in environmental conditions.

BRIEF DESCRIPTION OF THE DRAWINGS

The present invention will become fully understood from the detailed description given hereinbelow and the accompanying schematic drawings. In the drawings.

DETAILED DESCRIPTION OF ILLUSTRATIVE EMBODIMENTS

Figure 1:
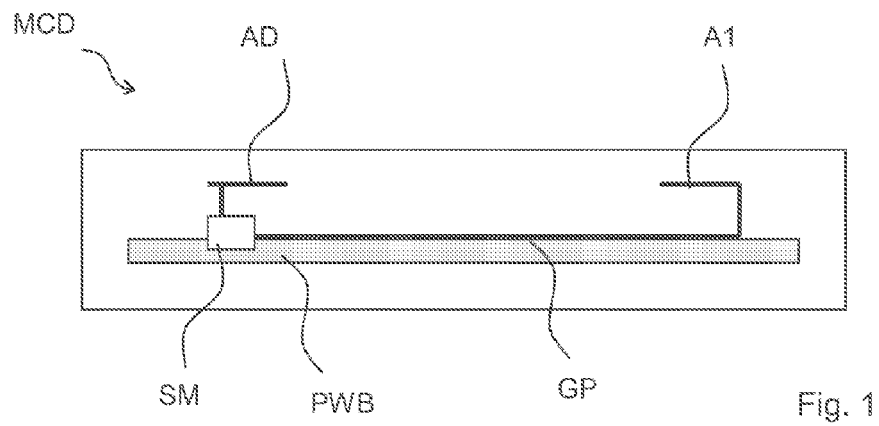
FIG. 1 shows a basic version of the present mobile communication device.

FIG. 1 shows a basic version of a mobile communication device MCD of the present invention. The mobile communication device MCD comprises a printed wiring board PWB on which a ground plane GP is arranged. The mobile communication device MCD further comprises a first antenna A1 and a diversity antenna AD. The diversity antenna AD is electrically connected to the ground plane GP via switching means SM. The switching means SM may comprise a predefined load impedance or a bandpass filter of the mobile communication device MCD.

Figure 2:
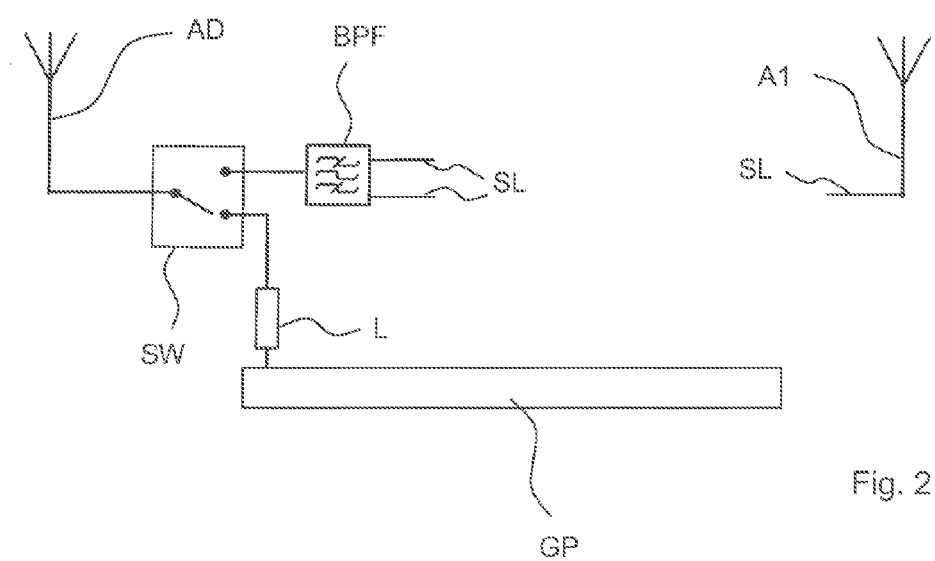
FIG. 2 shows a part of the equivalent circuit diagram.

FIG. 2 shows parts of an equivalent circuit diagram of the present mobile communication device. The device comprises a first antenna A1 and a diversity antenna AD. The diversity antenna AD is electrically connected to a switch SW. The switch SW can establish an electrical connection between the diversity antenna AD and a bandpass filter BPF. Alternatively, the switch SW can establish an electrical connection between the diversity antenna AD and a predefined load impedance L. The load impedance L electrically connects the diversity antenna AD with the ground plane GP.

The first antenna A1 is electrically connected to a signal line SL of the mobile communication device.

Figure 3:
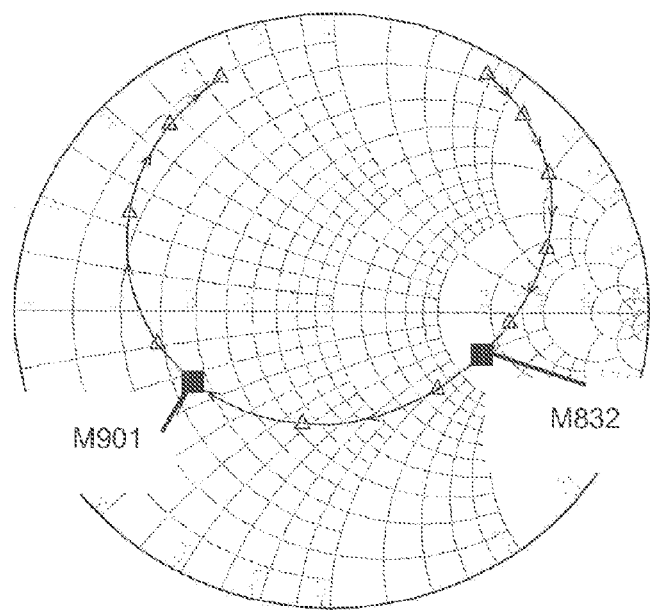
FIG. 3 shows the impedance of the first antenna while the diversity antenna is in use in a multi-antenna operation mode.

FIG. 3 shows the frequency dependent impedance of the first antenna within a frequency interval from 700 MHz to 1 GH. Mark M901 denotes the frequency 901 MHz. Mark M832 denotes the frequency 832 MHz. The meaning of these frequencies will become understood in FIG. 4.

Figure 4:
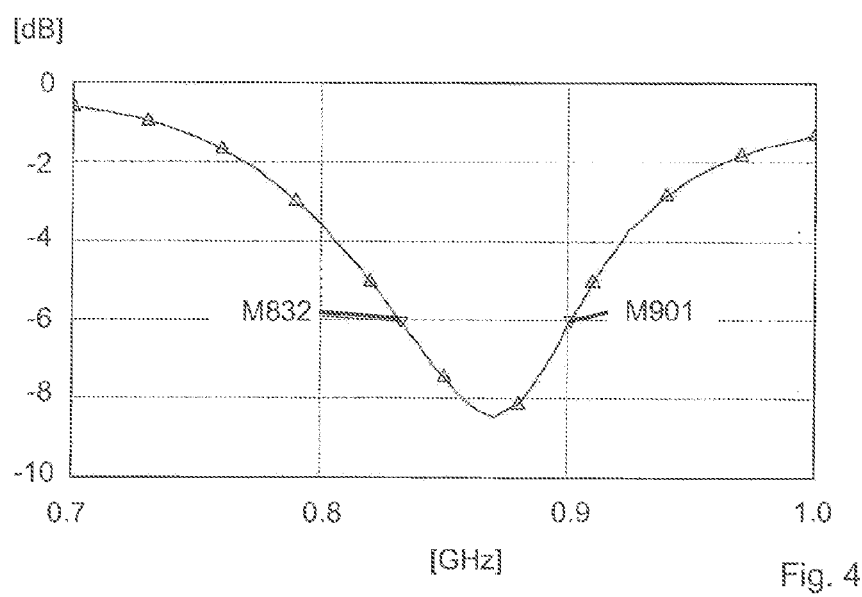
FIG. 4 shows the return loss $S_{11}$ of the first antenna while the diversity antenna is in use in a multi-antenna operation mode.

FIG. 4 shows the return loss $S_{11}$ of the first antenna while the diversity antenna is in use in a multi-antenna transmission mode such as LTE. For simplicity's sake, a return loss of 6 dB defines the edges of the band in which the first antenna can be operated. The return loss is better than −6 dB within a frequency interval reaching from 832 MHz, denoted by marker M832, and 901 MHz, denoted by marker M901. Thus, the bandwidth equals 69 MHz. The smallest return loss is approximately −8.25 dB.

Figure 5:
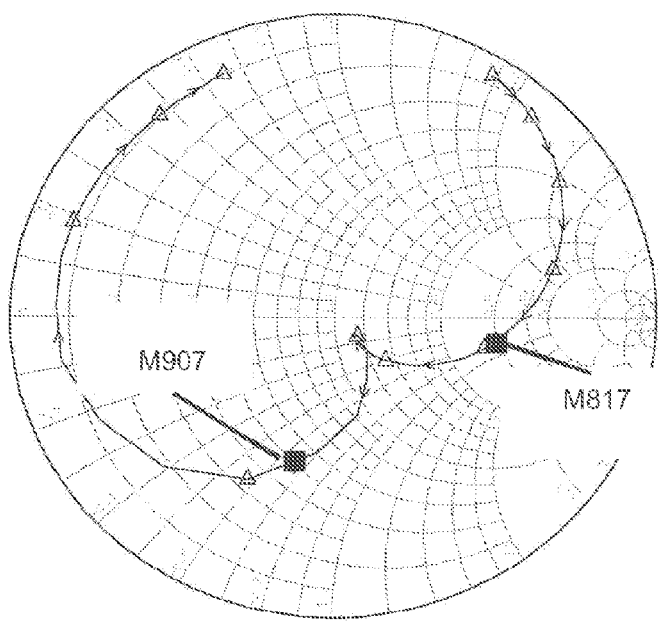
FIG. 5 shows the impedance of the first antenna while the diversity antenna is terminated via a predefined load impedance.

In contrast, FIG. 5 shows the frequency dependent impedance of the first antenna while the diversity antenna is not in use in a multi-antenna transmission mode but is electrically coupled to the ground plane. The diversity antenna is terminated via a predefined load impedance. Mark 907 denotes the frequency 907 MHz. Mark 817 denotes the frequency 817 MHz. These frequencies establish the −6 dB frequency gap shown in FIG. 6.

Figure 6:
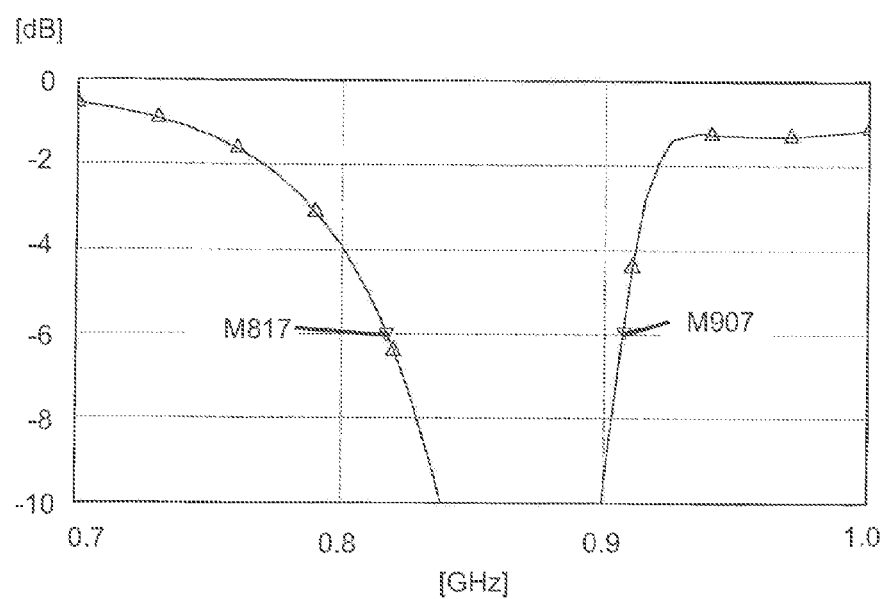
FIG. 6 shows the return loss $S_{11}$ of the first antenna while the diversity antenna is terminated via a predefined load impedance.

As can be seen in FIG. 6, the return loss of the first antenna is better than −6 dB in a frequency interval going from 817 MHz to 907 MHz. The width of the frequency band is 90 MHz. Thus, the width of the frequency band is enhanced by 21 MHz. Further, the minimum return loss is below −10 dB within the frequency band. It can clearly be seen that the bandwidth is enhanced and the return loss is enhanced, also, by terminating the diversity antenna via a predefined load impedance. Compared to the situation of FIG. 4 that bandwidth is enhanced by (90−69)/60=0.30=30%, i.e., by a factor of 1.3. Further, the return loss is improved by more than 3 dB.

Figure 7:
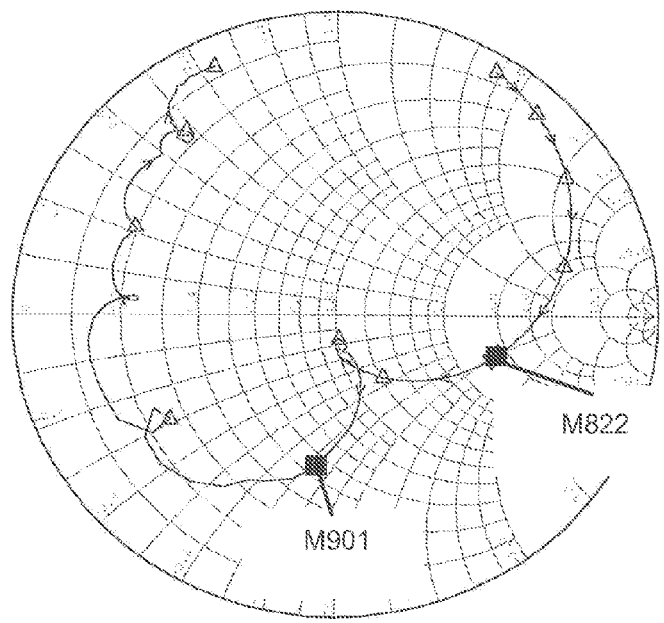
FIG. 7 shows the impedance of the first antenna while the diversity antenna is terminated via a bandpass filter.

FIG. 7 shows the frequency dependent impedance of the first antenna for a situation where the diversity antenna is terminated via a bandpass filter. Mark 901 denotes the frequency 901 MHz; mark M821 denotes the frequency 821 MHz.

Figure 8:
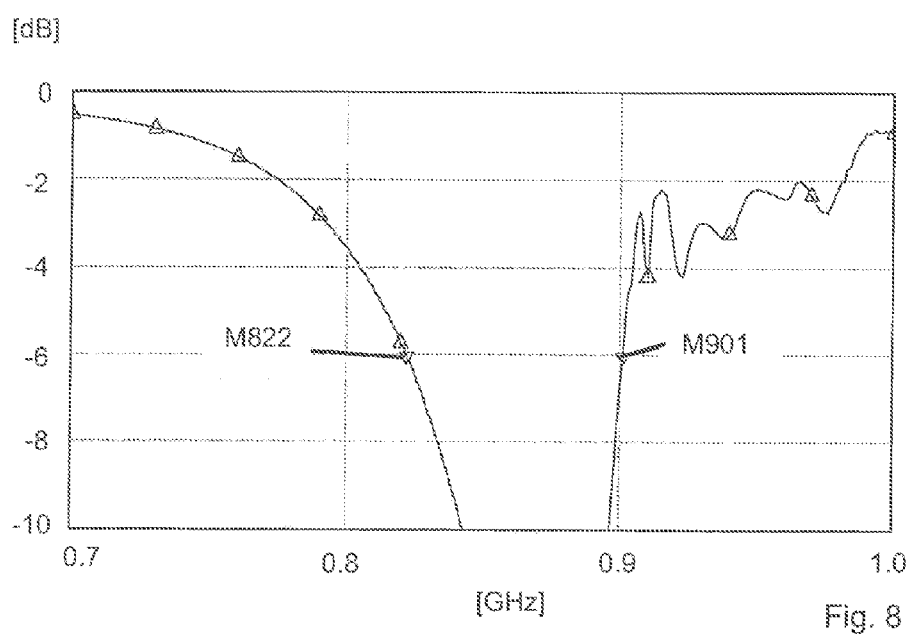
FIG. 8 shows the return loss $S_{11}$ of the first antenna while the diversity antenna is terminated via a bandpass filter.

As can be seen in FIG. 8, the −6 dB frequency band goes from 822 MHz to 901 MHz. The width of the frequency band is 79 MHz. Compared to the situation shown in FIG. 4, the antenna performance of the first antenna is enhanced. The bandwidth is enhanced by (79−69)/60=0.14=14%, i.e., by a factor of 1.14.

The present invention may comprise a termination of a diversity antenna via a predefined load impedance or via a bandpass filter. By electromagnetically coupling the diversity antenna to the ground plane of a mobile communication device, the antenna performance of the main antenna is improved. But the basic concept does not depend on details concerning this coupling. The invention is not restricted by the embodiments of the accompanying figures. Especially embodiments based on further coupling means such as inductive or capacitive elements or signal lines or strip lines are also possible. Thus, numerous variations departing from the figures are possible without departing from the invention.

The invention claimed is:

1. A mobile communication device comprising:
a ground plane;
a first antenna that is configured to couple electromagnetically to the ground plane during operation; and
a diversity antenna that is configured to couple electromagnetically to the ground plane during operation wherein during operation of the first antenna, wherein the coupling of the diversity antenna to the ground plane enhances performance of the first antenna;
wherein the first antenna and the diversity antenna are arranged on opposite ends of the ground plane; and
wherein the first antenna, the ground plane, and the diversity antenna are configured to work as a common radiating element.

2. The device of claim 1, wherein coupling the diversity antenna to the ground plane enhances the bandwidth of the first antenna by a factor of at least 1.1.

3. The device of claim 1, wherein coupling the diversity antenna to the ground plane enhances the transmission coefficient of the first antenna by at least 3 dB.

4. The device of claim 3, wherein the first antenna and the diversity antenna are specified for a LTE communication device.

5. The device of claim 1, further comprising a printed wiring board wherein the ground plane is arranged on the printed wiring board.

6. The device of claim 1, wherein coupling the diversity antenna to the ground plane enhances the performance of the first antenna in a GSM operation mode.

7. The device of claim 1, wherein coupling the diversity antenna to the ground plane enhances the performance of the WCDMA operation mode.

8. The device of claim 1, wherein coupling the diversity antenna to the ground plane enhances the performance of the LTE TDD operation mode.

9. The device of claim 1, wherein the diversity antenna is terminated with a band pass filter.

10. The device of claim 1, wherein the diversity antenna is terminated with a predefined load impedance.

11. The device of claim 1, further comprising a switch that provides an electrical connection between the diversity antenna on one side and a band pass filter or a predefined load impedance on the other side.

* * * * *